April 15, 1930.    B. STEVENS    1,754,654
TRANSMISSION
Filed April 17, 1928
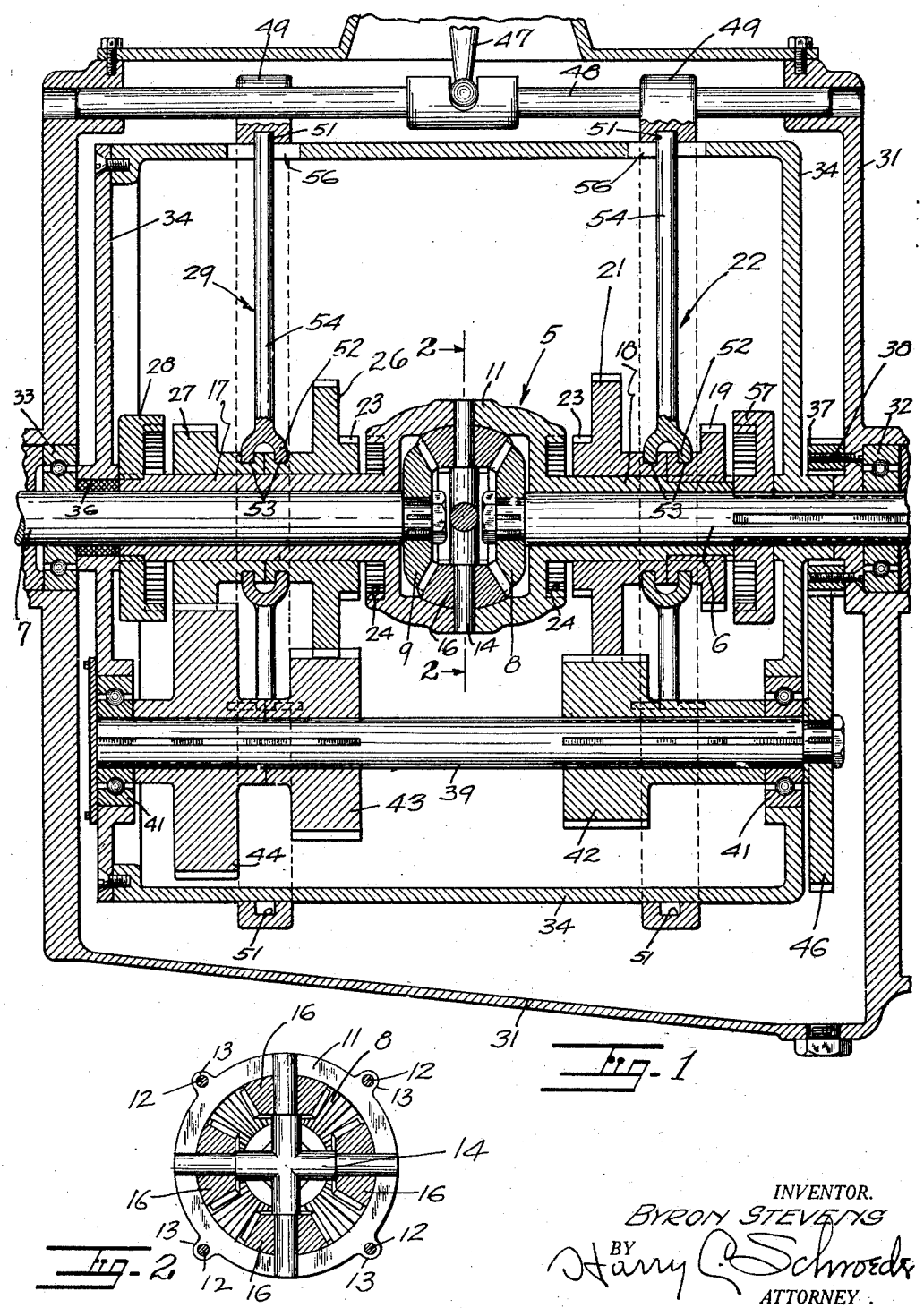
INVENTOR.
BYRON STEVENS
BY Harry C. Schroeder
ATTORNEY.

Patented Apr. 15, 1930

1,754,654

UNITED STATES PATENT OFFICE

BYRON STEVENS, OF OAKLAND, CALIFORNIA

TRANSMISSION

Application filed April 17, 1928. Serial No. 270,630.

The invention forming the subject matter of this application relates to transmissions of the type shown in my co-pending application for Letters Patent, Serial #257,149, filed February 27, 1928.

The primary object of the invention is to provide a transmission of the above type in which the counter shaft is revolved around the driving and driven shafts, thus obtaining a reduced rotation of the counter shaft and the countershaft gears thereon, so that the countershaft gears rotating around their axis at a comparatively slow speed, transfer to the sliding transmission gears the differential speed between the speed of rotation of the counter shaft around the axis of the main shaft and the speed of rotation of the countershaft around its own axis.

Another object of the invention is the provision of a transmission in which the counter shaft is rotated around the driving shaft and also around its own axis at such a ratio as to provide a material speed reduction from the driving shaft to the differential housing of the above type gear transmission.

A still further object of the invention is the provision of a transmission which in its general construction comprises a driving and driven shaft, a differential housing, and differential gears connecting the shafts, said differential housing being driven by sliding gears which, in turn, are rotated by transmission gears on a counter shaft; said counter shaft being so supported as to be rotated by the driving shaft around the axis of the driving shaft and being so connected by reduction gearing to the driving shaft as to have a rotation of its own around its own axis, thereby transmitting to the sliding gears a differential reduced speed of rotation.

In this specification and the annexed drawings, the invention is illustrated in the form considered to be the best, but it is to be understood that the invention is not limited to such form because it may be embodied in other forms. It is also to be understood that in and by the claims following the description, it is desired to cover the invention in whatsoever form it may be embodied.

The invention is clearly illustrated in the accompanying drawings, in which—

Figure 1 is a cross sectional view of the transmission; and

Figure 2 is a cross section of the differential gearing, the section being taken on the line 2—2 of Figure 1.

Referring to the accompanying drawings, in which similar reference characters designate similar parts thruout, my invention makes use of a differential, denoted in its entirety by the numeral 5, which is used for connecting a driving shaft 6 and a driven shaft 7. The differential 5, as described in my co-pending application, comprises a bevel gear 8, secured on a reduced end of the driving shaft 6. Another bevel gear 9 is similarly secured to the end of the driven shaft 7. The bevel gears 8 and 9 are disposed near the opposite sides of a differential housing 11, which is constructed in two halves secured to each other by means of bolts 12, extending thru complementary lugs 13 on the adjoining faces of the differential housing halves. On a spider 14 in the housing 11 are rotatably secured four differential bevel gears 16 constantly in mesh with the bevel gears 8 and 9. Each half of the differential housing 11 is formed with sleeves 17 and 18 in which sleeves the shafts 6 and 7 are rotatable.

The rotation of the differential housing 11 at different rates of speed is accomplished by the connection of sliding gears to the housing. A high speed sliding gear 19 and a second speed sliding gear 21 are slidable on the housing by means of a yoke 22, the structure of which is to be hereinafter described. The high speed sliding gear 19 is keyed to the sleeve 18. The second speed sliding gear 21 is provided with a clutch gear 23 adapted to engage a complementary internal gear 24 on the housing 11, thus enabling the gear 21 to transmit rotation to said housing. On the sleeve 17 are slidable a low speed sliding gear 26 and a reverse sliding gear 27. The low speed sliding gear is provided with a clutch gear 23 for engagement with an internal gear 24 on the adjacent half of the differential housing 11. The reverse gear 27 is adapted to engage a reverse driven gear 28 which in turn rotates the sleeve 17 and the differential housing 11. The sliding of the low speed sliding gear 26 and the reverse sliding gear 27 is accomplished by means of a yoke 29 similar in structure to the yoke 22.

Up to this point, my device is similar to the transmission disclosed in my co-pending application, and the operation thereof is accomplished by rotating the differential housing at a speed different from that of the driving shaft, simply by shifting the sliding gears into the corresponding clutch gears or internal gears, or by directly connecting the high speed sliding gear 19 to the driving shaft 6 by any conventional means. As described in my co-pending application, the transmission housing and the gear transmission is so designed that when the differential housing is rotated at half the speed of rotation of the driving shaft, or according to the design of the differential 5, at any other so determined ratio of speed between the driving shaft and the housing, then the driven shaft is caused to come to a standstill. The rotation of the differential housing at a higher speed than half the rotation of the shaft gear or higher than the aforementioned determined "standstill" ratio will cause the driven shaft to rotate in the same direction as the driving shaft but at a reduced speed.

The rotation of the differential housing 11 at a speed lower than the predetermined "standstill" speed ratio of the differential will cause the rotation of the driven shaft in a direction opposite to the rotation of the driving shaft.

My invention specifically relates to the transmission of rotation and power from the driving shaft 6 to the sliding gears 19, 21, 26, and 27. This transmission comprises a stationary transmission casing 31 in which are supported the driving and the driven shafts 6 and 7 in bearings 32 and 33 respectively. A transmission housing 34 surrounding the whole transmission gearing is rotatable inside of the casing 31. One end of the transmission housing 34 is disposed on the splined portion of the driving shaft 6 in such a manner as to be rotated thereby, while the other end of the transmission housing 34 is provided preferably with a babbitt or other antifriction bearing 36 so as to permit the rotation of the housing upon the driven shaft 7, while said driven shaft may be rotated therein at any rate of speed. A gear 37 is fixedly secured to the casing 31 by means of screws 38.

A counter shaft 39 is rotatably supported in ball bearings 41 in the opposite ends of the transmission housing 34. Upon the counter shaft 39 are disposed a second speed countershaft gear 42, a low speed countershaft gear 43, and a reverse countershaft gear 44, being constantly in mesh respectively with the second speed sliding gear 21, low speed sliding gear 26, and the reverse gear 27. The countershaft gears 42, 43, and 44 are rotated by the countershaft 39, said countershaft being splined at the ends thereof, with which said counter shaft gears engage. A transmission gear 46 is fixedly secured upon the end of the countershaft 39 and outside of the differential housing 34 in such a position as to be constantly in mesh with the fixed gear 37.

The shifting of the sliding gears is accomplished by the usual gear shift lever 47, which slides gear shift rods 48 in the casing 31 in the usual manner. Each shifting rod 48 carries thereon a ring 49 completely surrounding the rotating transmission housing 34. In the rings are provided annular grooves 51. Each yoke 22 and 29 comprises a ring 52 engaging annular grooves 53 on the hub of the respective sliding gears. Spider arms 54 extend from the ring 52. As many spider arms may be used as desirable to prevent the binding of the yoke. Each spider arm 54 extends thru an elongated slot 56. The slots 56 are so formed as to snugly guide the spider arm 52 in its movement in the direction parallel with the axis of rotation, but to prevent any rotating movement of the yoke relative to the housing 34. The free ends of the spider arm 54 are rotatably disposed in grooves 51 of the rings 49. It is apparent that the shifting of either of the gear shift rods 48 will cause the ring 49 thereon to move the corresponding spider arm 54 and the whole yoke therewith in the desired direction. When the housing 34 is rotated, the yokes 22 and 29 rotate therewith, the outside ends of the spider arms 54 sliding in the ring grooves 51.

In order to directly connect the housing 11 to the driving shaft 6, a high speed driving clutch gear 57 is secured on the splined end of the driving shaft 6 so as to be rotated therewith. When the high speed sliding gear 19 is shifted into the driving clutch gear 57, the former engages the internal gear of the latter and as the sliding gear 19 is keyed to the sleeve 18, the rotation of the clutch gear 57 will be transmitted directly to the sleeve 18 and to the housing 11.

The speed reduction is accomplished in the following manner: When the driving shaft 6 is rotated, the transmission housing 34 rotates therewith, so that the first movement of the countershaft 39 is the rotation thereof with the housing 34 around the axis of the driving shaft 6. While the housing 34 is rotated, the gear 46 being in mesh with the fixed gear 37, will travel around the fixed gear 37, whereby it is rotated at the desired reduced speed; thus, the countershaft 39 receives a secondary movement around its own axis. The rotation of the countershaft 39 around its own axis is in the same direction as the rotation of the housing 34 around the axis of the driving shaft 6. Assuming that the countershaft is fixed so that it has only one rotation, namely, the first one, around the axis of the driving shaft 6, then the countershaft gears being in constant mesh with the sliding gears would tend to rotate the sliding gears at the same speed of rotation as the housing 34 or the driving shaft 6. In this case, if either one of the sliding gears would be drivingly connected to the housing 11, the housing would be rotated at the same rate of speed as the transmission housing 34. This rotation in the housing would be in the same direction as the transmission housing 34.

On the other hand, assuming that the transmission housing 34 is fixed and the transmission gear 46 is rotated in the same direction of rotation as the driving shaft 6, then the countershaft gears would rotate the sliding gears in a direction opposite to the direction of rotation of the transmission gear 46. Therefore, when the housing 34 and the transmission gear 46 are rotated simultaneously in the same direction, then the countershaft gears transmit to the sliding gears the rotation of the housing, less the reverse rotation or "back slip" of the sliding gears caused by the rotation of the countershaft gears around their own axis. The amount of the "back slip" depends on the gear ratio between the individual countershaft gears and the sliding gears.

When the yoke 22 is so shifted as to bring the high speed gear 19 into driving engagement with the driving clutch gear 57, then the transmission housing 34, the driving shaft 6, the differential 5, and the countershaft gears rotate as one unit, thus causing the rotation of the driven shaft 7 at the same speed as the driving shaft 6.

When the yoke 22 is so shifted as to connect the second speed sliding gear 21 to the differential housing 11, then the differential housing 11 will be rotated at the speed of rotation of the driving shaft 6, less the back slip caused by the rotation of the countershaft gear 42, which back slip is determined by the ratio between the countershaft gear 42 and the second speed sliding gear 21.

For the purpose of illustration, it is assumed that the driving shaft 6 is rotated at a speed of 900 R. P. M. and that the ratio between the gears 37 and 46 is 1:2 and, furthermore, that the ratio between the second speed countershaft gear 42 and the second speed sliding gear 21 is 3:5. Now, when the transmission housing 34 is rotated by the driving shaft 6, the countershaft gear 39 is rotated around the axis of the driving shaft 6 at a speed of 900 R. P. M. During this rotation, the traveling of the gear 46 upon the fixed gear 37 will cause the countershaft 39 and the countershaft gear 46 to revolve in the same direction as the driving shaft 6, but at a speed of 450 R. P. M. The rotation alone of the countershaft gear 42 at 450 R. P. M. would cause the rotation of the second speed sliding gear 21 in a direction opposite to the rotation of the driving shaft 6 and at a speed of 270 R. P. M., the ratio between the gears 42 and 21 being 3:5. Thus, 270 R. P. M. is the amount of back slip caused by the rotation of the countershaft gear around its own axis. Therefore, the second speed sliding gear 21 will be actually rotated at the differential speed between the rotation of the housing 34 which is 900 R. P. M. and the opposite rotation caused by the countershaft gear 42 which is 270 R. P. M. The differential speed will be 900 minus 270 R. P. M., which equals 630 R. P. M. This is the reduced speed of rotation of the sliding gear 21 in the same direction as the rotation of the driving shaft 6.

Assuming that the differential housing 5 is constructed similarly to the transmission gearing disclosed in my co-pending application, viz: the structure of the differential 5 being such as to cause the driven shaft 7 to be at a standstill when the differential housing 11 is rotated at a speed half the speed of rotation of the driving shaft 6 and in the same direction. It willl be noted that 630 R. P. M. is higher than half the speed of rotation of the driving shaft 6. Therefore, the transmission will cause the rotation of the driven shaft 7 in the same direction as the driving shaft 6 but at a lower speed.

Further, assuming that the low speed gear ratio is 3:4 between the countershaft gear 43 and the sliding gear 26, which will cause a back slip of the sliding gear 26, amounting to 337½ R. P. M., when the driving shaft rotates at 900 R. P. M.—therefore, the actual rotation of the sliding gear 26 will be in the same direction as the driving shaft 6, but at a speed of 900 R. P. M. minus 337½ R. P. M. which amounts to 562½ R. P. M. It is to be noted that this speed is still more than half of the 900 R. P. M. at which the driving shaft 6 is rotated. Therefore, the sliding gear 26, when connected to the housing 11, will rotate the latter in the same direction as the driving shaft 6 but at a speed slightly higher than half of the rotation of the driving shaft. The driven shaft, therefore, will still be rotated in the same direction as the driving shaft 6, but at a much more reduced rate.

Assuming that the ratio of the reverse countershaft gear 44 and the reverse sliding gear 27 is 3:2, the back slip under the above conditions will amount to about 675 R. P. M. Therefore, the actual rotation of the reverse sliding gear 27 and the housing 11, when the reverse sliding gear is connected thereto, will be 900 minus 675, or 225 R. P. M. It is to be noted that this is lower than half the speed of rotation of the driving shaft 6. Therefore, the driven shaft 7 will be rotated by the differential 5 in a reverse direction, as described in my co-pending application.

It will be recognized that a compact transmission is provided in which the reduction of rotation is accomplished by a differential rotation of the countershaft in and with the transmission housing, and by a differential transmission connecting the driving and the driven shaft. The whole transmission, the sliding gears on the differential housing, and the differential housing itself are always rotated in the same direction so that the reversal of the driven shaft 7 is accomplished by the action of the differential 5, while the speed reduction of the sliding gears which drive the differential housing 11 is accomplished by the rotation of the countershaft gears around their own axis in the transmission housing and their rotation with the transmission housing around the axis of the driving shaft, thereby efficiently achieving the reduction of speed at which the differential housing 11 is to be rotated. The further reduction is accomplished in a manner described in my copending application.

I claim:

1. In a transmission, a driving shaft, a driven shaft, differential gears connecting the shafts, a differential housing operatively connected to said differential gears and rotatable on said shafts; sliding gears on said housing being selectively engageable therewith for imparting various speeds of rotation to said housing in the direction of the rotation of the driving shaft, driving gears for rotating said sliding gears, means for supporting said driving gears, said supporting means being fulcrumed on the driving shaft and being rotated thereby for moving said driving gear around the shaft; and means on said fulcrumed means for imparting to said driving gears a rotary movement around their own axis in the direction of the driving shaft rotation, thus rotating said sliding gears at a speed determined by the difference between the speed of rotation of said fulcrumed means and of said driving gears and by the gear ratio between the driving gears and the sliding gears.

2. In a transmission, a driving shaft, a driven shaft, differential gears connecting the shafts, a differential housing operatively connected to said differential gears and rotatable on said shafts; sliding gears on said housing being selectively engageable therewith; a transmission casing secured to the driving shaft and being rotated thereby; a countershaft rotatably supported in said casing, countershaft gears on the countershaft being constantly in mesh with the respective sliding gears, a fixed gear disposed outside of said casing, and a countershaft rotating gear being rolled on said fixed gear when the casing is rotated, thus imparting a rotary movement to the countershaft around its own axis.

3. In a transmission mechanism a driving shaft, a driven shaft, a carrier rotatably mounted on said driving shaft and driven shaft carrying gears meshing with gears affixed to said shafts, means disposed eccentric to the driving shaft for imparting rotation to the carrier, means for rotating said rotation imparting means around the driving shaft and rotating said rotation means upon its own axis.

4. In a transmission mechanism, a driving shaft carrying a gear, a driven shaft carrying a gear, a countershaft, a carrier having sleeves integral therewith and carrying gears meshing with the gear on the driving shaft and the gear on the driven shaft, sliding gears having complementary clutches carried by the sleeves on the carrier, gears affixed to the counter shaft for imparting rotation to the sliding gears, means for shifting the sliding gears and means for rotating the rotating means around the axis of the driving shaft.

5. In a device of the character described comprising a transmission casing having a sleeved housing therein carrying gears, a driving shaft having a gear affixed thereto and a driven shaft having a gear affixed thereto journaled in the housing, said shaft gears meshing with said housing gears, gears carried by the sleeves on said housing, sliding clutches for engaging the gears to the housing, means for operating the clutches, a gear affixed to the transmission casing, a casing within the transmission casing journaled on said driven shaft, a counter shaft journaled within the latter casing and having a gear at one of its ends meshing with the fixed gear on the transmission casing and having gears meshing with the gears on the sleeves of said housing.

6. A transmission mechanism comprising a stationary casing having a rotatable casing therewithin, a housing having sleeves extending from its opposite faces and rotatable within the rotatable casing and clutch members carried by the sleeves of said housing, differential gears carried within the said housing, a driving shaft having a gear affixed thereto and a driven shaft having a gear affixed thereto and journaled in the housing, said shaft gears meshing with said differential gears, sliding means carried by said sleeves for engaging certain of the gears and clutch members to the housing and another of said clutch members to the driving shaft, a gear affixed to the stationary casing, a counter shaft journaled in the rotatable casing, a gear carried by the counter shaft and meshing with the fixed gear on the stationary casing and gears carried by the counter shaft meshing with the gears carried by the sleeves of the said housing and clutch arms for moving said gears and clutch members, said clutch arms passing through the wall of the rotatable casing.

7. A transmission mechanism comprising a stationary casing having a rotatable casing therewithin, a housing having sleeves extending from its opposite faces and rotatable within the rotatable casing, gears and clutch members carried by the sleeves of said housing and differential gears carried within the said housing, a driving shaft having a gear affixed thereto and a driven shaft having a gear affixed thereto journaled in the housing, said shaft gears meshing with said differential gears, sliding means carried by said sleeves for engaging certain of the gears and clutch members to the housing and another of said clutch members to the driving shaft, a gear affixed to the stationary casing, a counter shaft journaled in the rotatable casing, a gear carried by the counter shaft and meshing with the fixed gear on the stationary casing and gears carried by the counter shaft meshing with the gears carried by the sleeves of the said housing, said rotatable casing having openings through the wall thereof, bands spanning said openings and having grooves in their inner peripheral face, clutch arms having one of their ends seated in the grooves and the other of their ends engaging the gears and clutch members and a yoke for imparting reciprocal movement to the bands.

In testimony whereof I affix my signature.

BYRON STEVENS.